United States Patent
Thomas

(10) Patent No.: US 6,778,070 B1
(45) Date of Patent: Aug. 17, 2004

(54) REMOTE TRANSMISSION APPARATUS OPERATING BY INDUCTIVE COUPLING

(75) Inventor: Thierry Thomas, Varces Allieres et Risset (FR)

(73) Assignee: Commissariat a l'Energie Atomique (FR)

(*) Notice: Subject to any disclaimer, the term of this patent is extended or adjusted under 35 U.S.C. 154(b) by 0 days.

(21) Appl. No.: 09/281,110

(22) Filed: Mar. 29, 1999

(30) Foreign Application Priority Data

Mar. 31, 1998 (FR) .............................................. 98 03962

(51) Int. Cl.$^7$ ................................................ H04Q 5/22
(52) U.S. Cl. .................. 340/10.1; 340/10.51; 340/10.4; 340/10.34; 340/572.4; 340/572.1; 340/10.5
(58) Field of Search ............................. 340/10.1, 10.51, 340/870.32, 14.62, 825.78, 10.4, 10.34, 572.4, 551, 570, 572.1, 10.32, 10.5

(56) References Cited

U.S. PATENT DOCUMENTS

| | | | |
|---|---|---|---|
| 3,299,421 A | 1/1967 | Neitzel | 340/347 |
| 4,196,418 A | 4/1980 | Kip et al. | 340/152 |
| 5,302,954 A | 4/1994 | Brroks et al. | 342/44 |
| 5,345,231 A * | 9/1994 | Koo et al. | 340/870.31 |
| 5,479,172 A * | 12/1995 | Smith et al. | 342/51 |
| 5,721,535 A | 2/1998 | Ikefuji | 340/825.54 |
| 5,960,207 A * | 9/1999 | Brown | 395/750.01 |
| 6,011,488 A * | 1/2000 | Busser | 340/825.5 |

FOREIGN PATENT DOCUMENTS

| | | | |
|---|---|---|---|
| EP | 0204542 | 3/1986 | G06K/7/08 |
| EP | 0198642 | * 10/1986 | G07F/7/10 |
| EP | 0198642 | * 5/1996 | G07F/7/10 |
| EP | 0706151 | * 10/1996 | G06K/19/07 |
| FR | 2623311 | 11/1987 | G06K/9/68 |
| WO | 9638805 | 12/1996 | G06K/7/08 |
| WO | 9705504 | 2/1997 | G01S/13/02 |

* cited by examiner

Primary Examiner—Michael Horabik
Assistant Examiner—Vernal Brown
(74) Attorney, Agent, or Firm—Hayes Soloway P.C.

(57) ABSTRACT

A remote transmission apparatus for a portable object equipped with an antenna and connected by inductive coupling to a fixed station comprises data processor for processing and storing data concerning the portable object; a voltage rectifier for transforming the AC voltage supplied by the antenna of the portable object into a DC voltage carried by a power line (Vdd) to the data processor; a voltage regulator for regulating the DC voltage provided by the rectifier; and a modulator for modulating the signals to be transmitted comprising a transistor connected to an electronic dipole that causes a drop in voltage between the input and output of said modulator, said modulator being connected to the input of the voltage regulator to control the voltage on the terminals of the antenna in order to modulate the current flowing in the antenna.

10 Claims, 3 Drawing Sheets

REMOTE TRANSMISSION APPARATUS OPERATING BY INDUCTIVE COUPLING

FIELD OF THE INVENTION

The present invention relates to a remote transmission apparatus for portable objects such as cards, tickets, labels, etc. connected by inductive coupling to a fixed station such as a card or label reader or interrogator.

The invention has applications in all areas where data are to be exchanged by induction without physical contact between a portable object and a fixed station, in particular in the field of identifying items or objects, for example in controlling access to IT services, or card-payment tolls.

BACKGROUND ART

Techniques are known in the field of data exchange without physical contact for producing one- or two-way systems in which data are exchanged by induction between portable objects and a fixed station.

"Fixed station" is understood to mean any relatively large-size interrogator, reader or any type of receiver that contains its own power-supply means that are usually standard electrical equipment.

"Portable object" is understood to mean any chip-card, label or any type of small-size transponder that uses a very restrictive independent power source to send data to the fixed station. The portable objects are usually small, being the size of a credit card, for example. The portable object may be active, i.e. containing its own power source such as a battery or cell, or passive, i.e. remotely powered. A remotely powered portable object draws its power from the fixed station by means of inductive coupling which, in these systems, is achieved by means of coil-type antennas in conductor circuits. Consequently the portable object is no longer powered when it leaves the electromagnetic field of the fixed station, i.e. as soon as nominal coupling conditions are no longer present.

A standard system for exchanging data by inductive coupling is shown in FIG. 1. The data exchange system generally comprises a fixed station 1 and one or more portable objects 10. The fixed station 1 comprises a set of electronic circuits 2, coupled to two antenna coils 3 and 4. One of the antenna coils (coil 4) emits an alternating magnetic field which is used to send data intended for the portable object 10. A second antenna coil 3 collects a signal induced by the secondary emission caused by the current induced in the antenna of the portable object.

In the embodiment shown in FIG. 1 the fixed station comprises two antennas, one for receiving and one for transmitting messages. It is, however, possible to use the same antenna to fulfil these two functions.

Portable object 10 comprises a set of electronic circuits 11 connected to the terminals of an antenna coil 12. In the embodiment shown in FIG. 1 a capacitor 13 is connected in parallel to the terminals of antenna 12 to form a resonant circuit.

A fixed station usually emits a powerful alternating magnetic field in a volume of space chosen for the application. As described by Lenz's law, the portable object interacts with this magnetic field via its antenna by emitting a secondary magnetic field that is a function of the impedance of the circuits connected to the antenna. In return, the secondary field induces a voltage that is detectable in the antenna of the fixed station.

This type of data exchange method is described, for example in the patent U.S. Pat. No. 3,299,424. This patent particularly describes a data exchange system in which the portable object is remotely powered and comprises a single antenna coil. In this patent the means for transmitting the data from the portable object to the fixed station consists of an impedor connected in series with a circuit breaker, the resulting assembly being connected to the terminals of the antenna. The impedance of the circuits connected to the antenna coil is thus modulated, as is the secondary magnetic field and consequently the associated voltage induced in the antenna of the fixed station.

This patent also describes the use of a capacitor combined with the antenna coil of the portable object in order to obtain a parallel inductance-capacitance resonant circuit designed to increase the voltage on the terminals of the antenna by creating an overvoltage relative to the electromotive force (e.m.f.) in the coil and increasing the effect induced in return in the coil antenna of the fixed station due to the presence of the portable object.

However, the means used in this patent to recover the remote power supply are closely related to the data transfer means which, in this system, consist of a diode tunnel.

Other more recent documents such as the patents U.S. Pat. No. 4,196,418 and FR-A-2 623 311 describe remotely powered portable objects in which the power supply is collected by the portable object from the induced voltage available on the terminals of the antenna of the portable object. This voltage, which is an alternating voltage on the terminals of the antenna, is transformed into a DC voltage by a rectifier that consists, in these systems, of a twin-diode voltage doubler connected to one of the terminals of the antenna, the other terminal of the antenna being connected to the mid-point of two storage capacitors that collect the rectified voltage.

Another patent, EP-0 204 542, describes a system that comprises means for rectifying the voltage achieved using two diodes, the mid-point of the antenna coil being connected to the zero point of the assembly.

In other systems the rectifying means are achieved using a four-diode bridge, namely a Graetz bridge, or MOS transistors wired as diodes (i.e. transistors whose gate is connected to their drain). These rectifying means are particularly described in documents U.S. Pat. No. 5,479,172 and WO-96 38805.

Patent WO 97/05504 describes a data exchange system that comprises a voltage-trebling rectifier together with a modulation function that acts on the antenna of the portable object; the antenna itself is connected in parallel to a capacitor to form a resonant circuit.

The systems described in patents U.S. Pat. No. 4,196,418 and FR-2 623 311 (described above) also comprise a stabilization function of the rectified voltage added to the remote power supply function described above. This stabilization function of the rectified voltage is achieved using a simple electronic component, namely a Zener diode. The electromotive force induced in the antenna coil of the portable object is proportional to the mutual coupling coefficient between the coil and that of the antenna of the fixed station. This coupling coefficient may vary over a wide range of values that reflect the required operating flexibility without physical contact. The voltage available on the terminals of the portable object is determined by the electromotive force, the internal impedance of the antenna and the load connected to it. The non-linear voltage-current characteristics of a Zener diode make it capable of simply stabilizing the rectified voltage.

The rectified voltage stabilizing function may also be performed using an electronic arrangement comprising a reference voltage, a differential amplifier and a controlled resistor, for example a transistor. This electronic arrangement, normally known as a shunt regulator, adapts the load connected to a voltage generator with a non-negligible internal impedance so that the voltage output by the generator is at a given value; the voltage generator may, for example, be an antenna connected to a rectifier.

Numerous documents describe a shunt regulator applied to a remote data exchange system. Examples of these documents are patents U.S. Pat. Nos. 5,302,954, 5,479,172 and EP-A2-0 706 151.

In remote data exchange systems it is possible to regulate voltage using a series regulator that supplies on output a regulated voltage with a given value converted from a non-regulated voltage of a higher value applied to its input. However, this type of regulator has the drawback of not controlling the voltage applied on input; this voltage may therefore be high. In a portable object in which all the electronic circuits may be integrated in a single electronic chip, voltage strength requirements apply to every part of the circuit, including the terminals of the antenna coil. This type of serial regulator is therefore unsuitable for constructing a portable object.

Moreover, in some of these documents the modulation function is achieved either by a circuit-breaker that short-circuits the antenna, or by a circuit-breaker connected in series with a capacitor, this assembly being connected to the terminals of the antenna to modify its resonance frequency.

In other apparatuses, the modulation function is performed by a circuit-breaker connected in series with a resistor, which can be used to control the antenna quality coefficient without modifying the resonance frequency. This type of modulation function is described, for example, in patents EP-A2-0 204 542 and WO 97/05504.

Other types of modulation functions are achieved using a diode, a Zener diode or an inductor.

However, where modulation is achieved by a circuit-breaker connected in series with a resistor, or simply by a circuit-breaker connected in parallel to the terminals of the antenna or on the rectified voltage, the resonant antenna quality coefficient is modified, thereby modifying the status of the portable object. This change in the antenna quality coefficient is reflected by a modification in the dissipated power taken from the power supplied by the fixed station, which explains why this modulation may be detected by the fixed station.

However, this type of modulation modifies the current load of the antenna. The voltage on the terminals of the antenna and the rectified voltage are therefore modified in consequence and the shunt regulator has the effect of compensating for the load modification and thereby cancels out the required modulation effect. This type of modulation function is therefore incompatible with the shunt regulation function.

Where modulation is achieved by an assembly consisting of a circuit-breaker connected in series with a capacitor, the assembly being connected in parallel to the terminals of the antenna in order to modify the resonance frequency of the antenna, the modulation is compatible with the shunt regulation function. On the other hand, it reacts to compensate any modification of the voltage available on the terminals of the antenna, causing concomitant load modulation unless the excursion of the resonance frequency modulation is symmetrical relative to the frequency of the magnetic field emitted by the fixed station, as described in patent EP-A-0 198 642. In this case the power dissipation of the portable object remains the same for the two binary statuses of the modulation.

More generally speaking, dual modulation of the resonance frequency and, involuntarily, of the quality coefficient, make detection of this modulation by the fixed station difficult.

In order to simplify the present disclosure, FIG. 2 shows examples of regulating means and modulating means combined in the same diagram of a remote transmission apparatus; it should be noted that the combination thus illustrated is of no practical use. This apparatus includes the same components of the portable object described above for FIG. 1, namely antenna 12 connected in parallel to capacitor 13 and the assembly of electronic circuits 11. These electronic circuits comprise a voltage rectifier 15 which may, as in the example shown, be a Graetz bridge, modulating means 18, a voltage regulator 16 and a storage capacitor 17 intended to supply a regulated voltage Vdd to power all the electronic circuits.

In the apparatus shown in FIG. 2, regulator 16 is a shunt regulator as described above. It comprises a transistor 16a, a differential amplifier 16b and a reference voltage 16c.

The modulator 18 is constructed using an impedor 18b connected in series with a circuit-breaker transistor 18a, the impedor-transistor assembly being connected to the terminals of antenna 12. Circuit-breaker 18a is controlled by a digital signal transmitted by voltage line 18c via the gate of the transistor. This digital signal represents the message to be transmitted in the form of series binary data.

In this type of system, transmission of data from the portable object to the fixed station may be interpreted as modulation of one or more parameters of an inductor-capacitor-resistor type resonant circuit. These parameters are the resonance frequency and the quality coefficient of the assembly, i.e. the resonant antenna formed by the assembly 12, 13, charged by electronic circuits 11. The power dissipated in the portable object is taken from the power supplied to the antenna of the fixed station to emit the magnetic field. A variation in the quality coefficient of the portable object is therefore reflected in a power variation in the fixed station, while a variation in the resonance frequency of the portable object causes a phase variation in the magnetic field of the secondary emission of the antenna coil relative to the magnetic field emitted by the coil of the fixed station.

As in some apparatuses in the prior art described above, the operation of the shunt regulator is incompatible with modulation by varying the quality coefficient because the shunt regulator 16 compensates for the load modification caused by modulator 18, and thereby cancels out the required effect.

DISCLOSURE OF THE INVENTION

It is the aim of the present invention to overcome the drawbacks of the techniques described above. It does this by proposing a remote transmission apparatus that operates by inductive coupling between a portable object and a fixed station, wherein the modulation function acts on the antenna of the portable object while remaining compatible with the remote power supply functions and creating a signal that is detectable in the antenna of the fixed station. In other words, the remote transmission apparatus of the invention is used to modulate the antenna load, i.e. it modulates the quality coefficient of the assembly of the portable object while remaining compatible with the shunt regulation function described above. The apparatus can also be used to obtain a load modulation rate that can be adjusted or preset while the components of the electronic circuit of the portable object are being defined.

More precisely, the invention relates to a remote transmission apparatus for portable objects provided with an antenna and connected by inductive coupling to a fixed station that is provided with at least one power source and at least one antenna that emits an alternating magnetic field and receives signals transmitted by the portable object, comprising:

means for processing and storing data concerning the portable object;

a voltage rectifier for transforming the AC voltage supplied by the antenna into a DC voltage carried by a power line to the processing and storing means;

a voltage regulator for regulating the DC voltage provided by the rectifier;

means for modulating the signals to be transmitted; and means for demodulating the signals received from the fixed station, characterized in that the modulation means comprise a transistor connected to an electronic dipole that causes a drop in voltage between the input and output of said modulation means, said modulation means being connected to the input of the voltage regulator to control the voltage on the terminals of the antenna in order to modulate the current flowing in the said antenna to allow remote transmission.

The voltage on the terminals of the antenna is, in fact, the sum of a regulated voltage and a modulated voltage determined by the values chosen for the modulation means.

In one embodiment of the invention the transistor and the dipole of the modulation means are connected in parallel with one another, the transistor-dipole assembly being connected in series on the voltage supply line between one output of the rectifier and one input of the voltage regulator.

In another embodiment of the invention the transistor and the dipole of the modulation means are connected in series with one another, the transistor-dipole assembly being connected to a divider bridge that is itself connected to one input of the voltage regulator.

According to the invention, the electronic dipole may be a diode, a Zener diode or a MOS transistor whose gate is connected to its drain.

In one embodiment of the invention, the voltage regulator comprises a transistor whose drain and source are connected to the outputs of the rectifier and a differential amplifier whose output is connected to the gate of the transistor and whose inputs receive both a reference voltage and the voltage from the power supply line.

In another embodiment of the invention, the voltage regulator comprises a transistor connected in parallel to the terminals of the antenna and a differential amplifier whose output is connected to the gate of the transistor and whose inputs receive both a reference voltage and the voltage from the power supply line.

In a third embodiment of the invention, the voltage regulator comprises a first transistor connected in parallel to the terminals of the antenna, a second transistor connected to the output of the rectifier and a differential amplifier whose inputs receive both a reference voltage and the voltage from the power supply line, and whose output is connected to a distributor circuit that is in turn connected to the gates of the first and second transistors.

DESCRIPTION OF EMBODIMENTS OF THE INVENTION

The invention relates to a remote transmission apparatus designed for a remotely-powered portable object. The apparatus comprises a rectifier connected to a shunt regulator together with modulating means that act on the antenna of the portable object while remaining compatible with the remote power functions (rectifier+shunt regulator) of the portable object and capable of creating a signal that is detectable in the antenna of the fixed station.

Said modulation means consist of a transistor connected to an electronic dipole that causes a drop in voltage between the input and output of said modulation means; the transistor/dipole assembly is connected to the input of the voltage regulator such that is controls the voltage on the terminals of the antenna.

The connections between the modulation means, the rectifier and the shunt regulator may be achieved by various embodiments.

Figure 1:
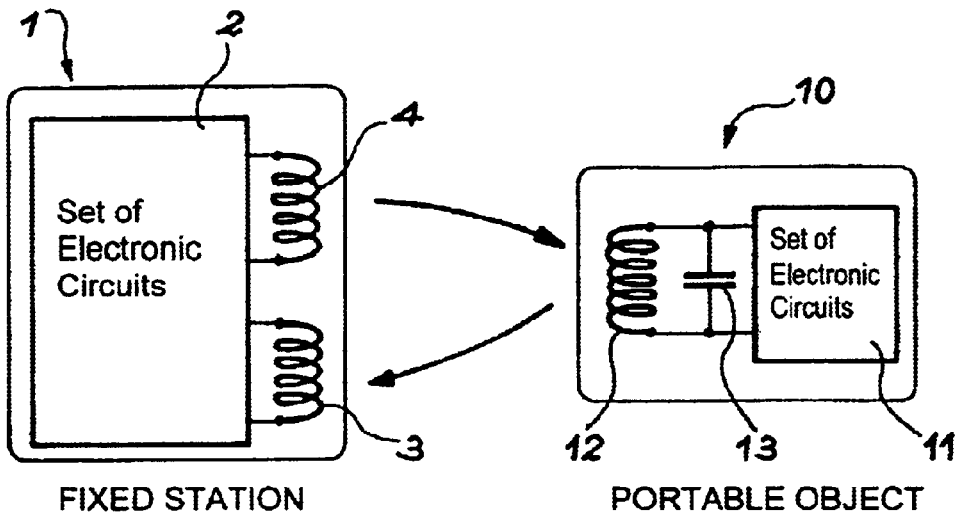
FIG. 1 (described above) is a schematic representation of a remote data exchange system comprising a portable object and a fixed station.
Figure 2:
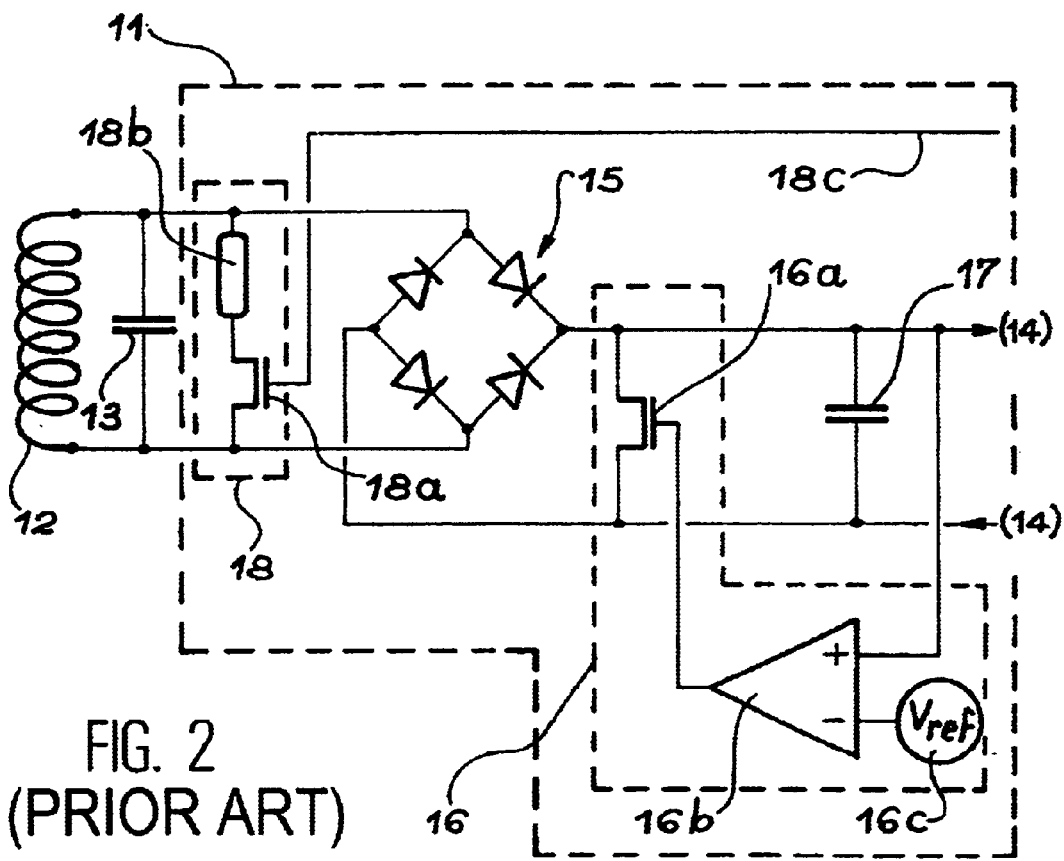
FIG. 2 (described above) is a schematic representation of a remote transmission apparatus of the known art.
Figure 3:
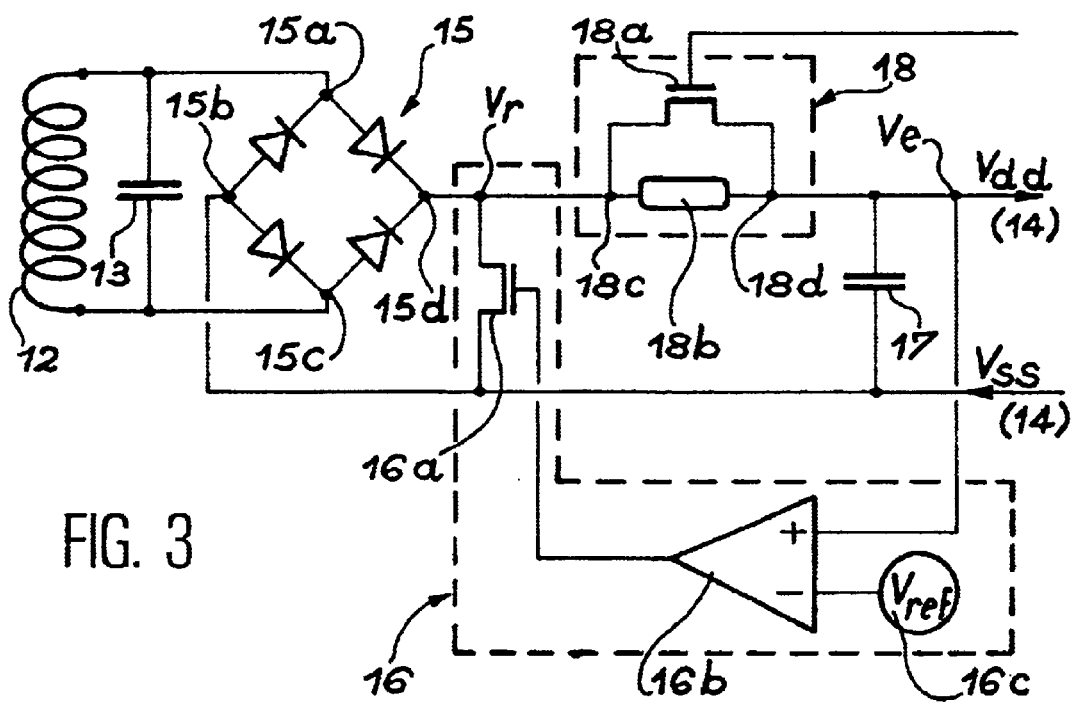
FIGS. 3, 4, 5 and 6 show respectively a first, second, third and fourth embodiment of the remote transmission apparatus of the invention.

FIG. 3 shows one embodiment or the remote transmission apparatus of the invention. As in the examples shown in FIGS. 1 and 2, the portable object comprises an antenna 12 formed by a conducting circuit coil whose terminals are connected to a capacitor 13, thereby forming a resonant circuit. A voltage rectifier is connected in parallel to the terminals of the antenna 12 to transform the AC voltage received by antenna 12 into a DC voltage that is carried by the power supply line Vdd to the processing and storage means 14.

In one embodiment of the invention, the rectifier 15 may be a Graetz bridge connected to the two terminals of coil 12 by connection points 15a and 15c. The connection point 15b of the rectifier is connected directly to the output Vss of the apparatus.

Connection point 15d of the rectifier is connected to the input of modulation circuit 18, also referred to as the modulator. Modulator 18 comprises an electronic dipole 18b connected in parallel to a circuit-breaker transistor 18a. This assembly composed of circuit-breaker 18a and dipole 18b is connected in series to the power supply line Vdd between the output point Vr of rectifier 15 and input point Ve of differential amplifier 16b (described in more detail below). The voltage on this input Ve, relative to the ground point Vss, is regulated voltage Vdd.

The electronic dipole 18b of modulator 18 is selected so that it causes a drop in voltage Vr-Vdd between points 18c and 18d of the modulator when transistor 18a is in the open state. When transistor 18a is in the closed state, the drop in voltage introduced by modulator 18 must be lower, and preferably negligible.

It will be seen that the relative variation in the quality coefficient of the portable object is equal to the relative variation of the voltage thus obtained on the output of the rectifier, provided that the drop in voltage on the terminals of the diodes of rectifier 15 is overlooked. For example, if the regulated voltage Vdd is set at a value of 4 volts and modulation circuit 18 introduces a series voltage of 1 volt when transistor 18a is open and 0 volt when it is closed, the ratio between the value deviation and the maximum value, known as the quality coefficient modulation depth, is approximately 20%.

According to the invention, the electronic dipole 18b is a component with non-linear current-voltage characteristics such that the voltage on its terminals is practically constant; this makes it possible to maintain the quality coefficient modulation depth of the portable object at a practically constant value.

Depending on the embodiment chosen, the electronic dipole 18b may be a resistor, a diode, a Zener diode or a transistor in which the gate is connected to the drain.

Electronic dipole 18b may also consist of a plurality of diodes connected in series.

If electronic dipole 18b is a resistor, the drop in voltage between points 18c and 18d is a function of the current carried by power supply line Vdd.

In the embodiment shown in FIG. 3, regulator 16 is connected to a capacitor 17 connected between the power supply line Vdd and output line Vss such that it supplies a stabilized voltage Vdd at point Ve.

Regulator 16 comprises a differential amplifier 16b connected to a transistor 16a. The drain and source of said transistor 16a are respectively connected to power supply line Vdd and output voltage line Vss of the apparatus. The gate of transistor 16a is connected to the output of the differential amplifier 16b whose negative input receives a reference voltage Vref, numbered 16c, and whose positive input receives the voltage at point Ve that is the regulated voltage carried by power supply line Vdd.

Figure 4:
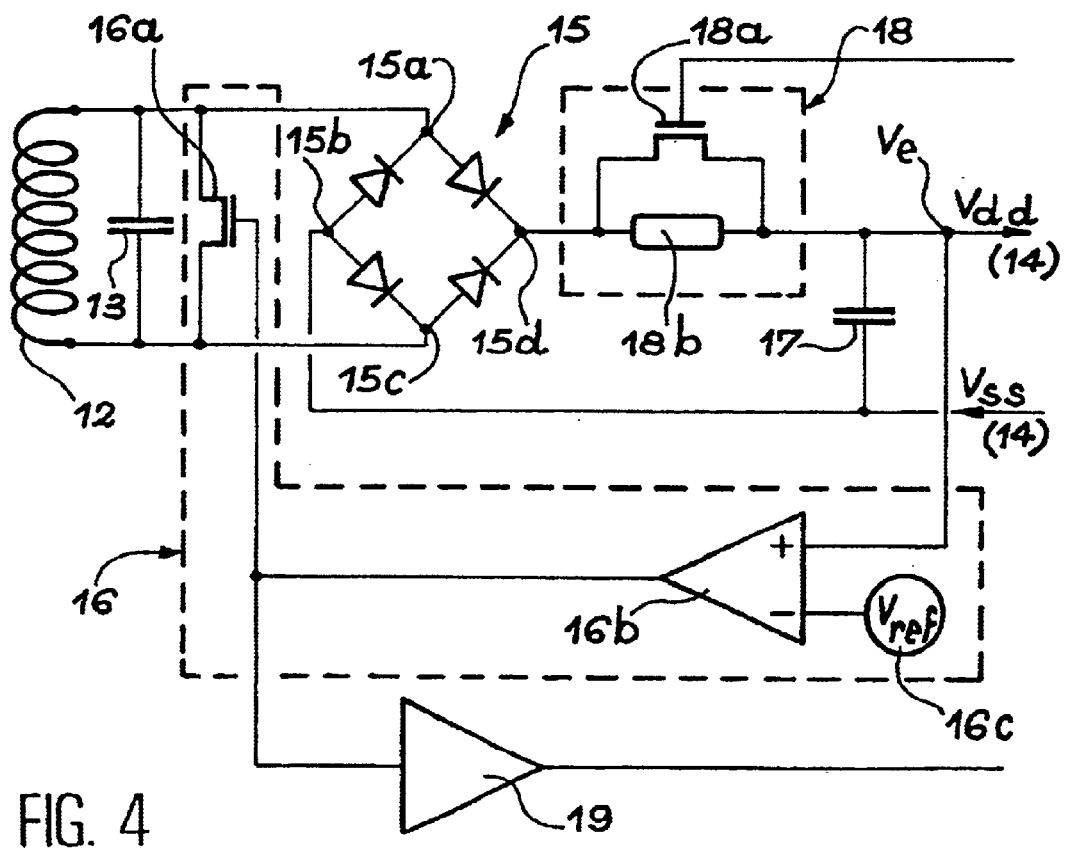

FIG. 4 shows a different embodiment of the invention. In this embodiment, regulator 16 is connected to the output of the resonant circuit formed by antenna 12 and capacitor 13. As in the previous embodiment, regulator 16 comprises a transistor 16a whose drain and source are connected to resonant circuit 12–13. The gate of transistor 16a is connected to the output of the differential amplifier 16b of regulating circuit 16 whose positive terminal receives the current carried by power supply line Vdd and whose negative terminal receives a reference voltage Vref supplied by voltage generator 16c. The gate of transistor 16a is also connected to the input of an amplifier 19 belonging to the demodulation circuit. This demodulation circuit will not be described in any more detail as it is similar to other demodulation circuits that are standard in portable objects.

As in the previous embodiment, modulator 18 consists of an electronic dipole 18b connected in parallel with a circuit-breaker transistor 18a that is connected in series between the output 15d of rectifier 15 and the connection point Ve. In other words, the modulator is connected in series to the power supply line Vdd of the apparatus.

In this embodiment, the data sent from the fixed station to the portable object are transmitted by modulation of the magnetic field emitted by the antenna of the fixed station. This modulation of the magnetic field causes a modulation of the electromagnetic strength induced in the antenna coil 12 of the portable object. The shunt regulator 16 reacts to this modulation to regulate the remote power supply voltage Vdd. It is thus advantageous to use the control signal of transistor 16a to detect and demodulate the data transmitted by the fixed station.

Figure 5:
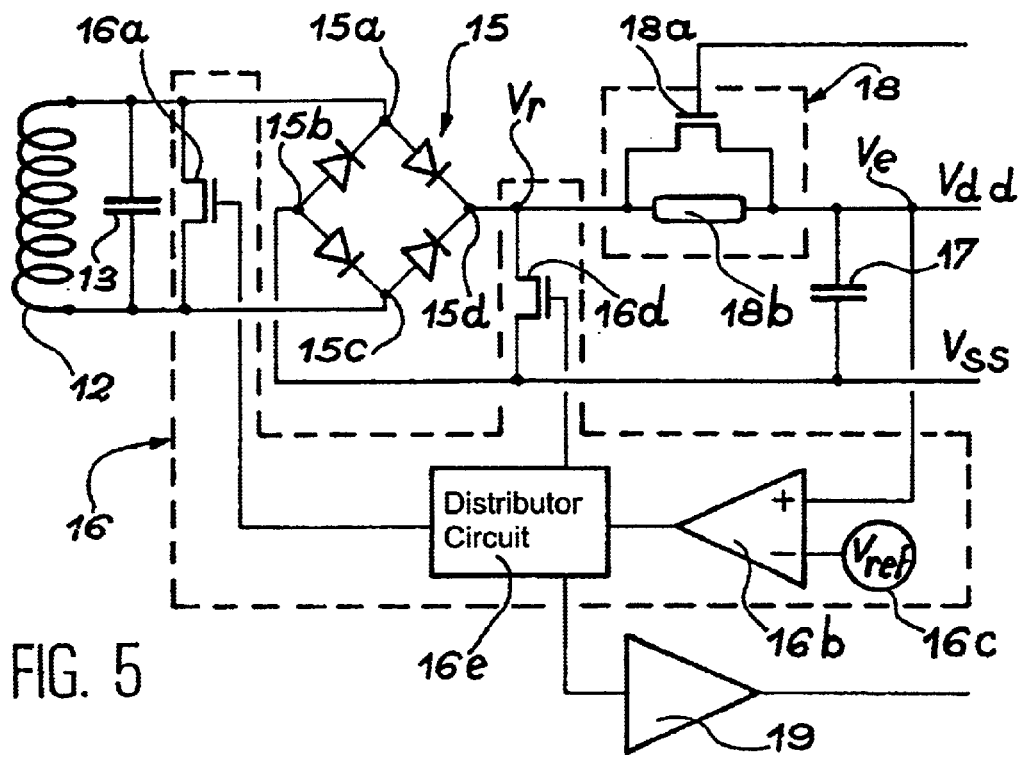

FIG. 5 shows a schematic representation of a third embodiment of the apparatus of the invention. In this embodiment, transistor 16a of regulator 16 is connected as in the circuit shown in FIG. 4, i.e. in parallel between the two terminals of resonant circuit 12/13, and rectifier 15 is connected by its terminals 15a and 15c in parallel to capacitor 13, and by terminal 15d in series to modulator 18.

As in the embodiment of FIG. 4, modulator 18 comprises an electronic dipole 18b connected in parallel to a circuit-breaker transistor 18a, the assembly being connected in series to power supply line Vdd between output 15d of rectifier 15 and connection bridge Ve.

In this embodiment, the regulator comprises, in addition to transistor 16a connected in parallel to resonant circuit 12/13, a second transistor 16d connected in parallel to outputs 15b and 15d of regulator 15. In other words, transistor 16d is connected between power supply line Vdd and output line Vss of the apparatus. The gate of each transistor 16a and 16d is connected to an additional circuit 16e, known as the distributor circuit, whose role is to distribute the control voltage supplied by differential amplifier 16b between transistors 16a and 16d.

First transistor 16a is used to drive most of the current required for regulation and second transistor 16b is used to drive smaller variations in current, but more rapidly. This type of shunt regulator has the advantage of meeting the need for rapid reaction, for example during transfer of data at a high throughput rate.

Figure 6:
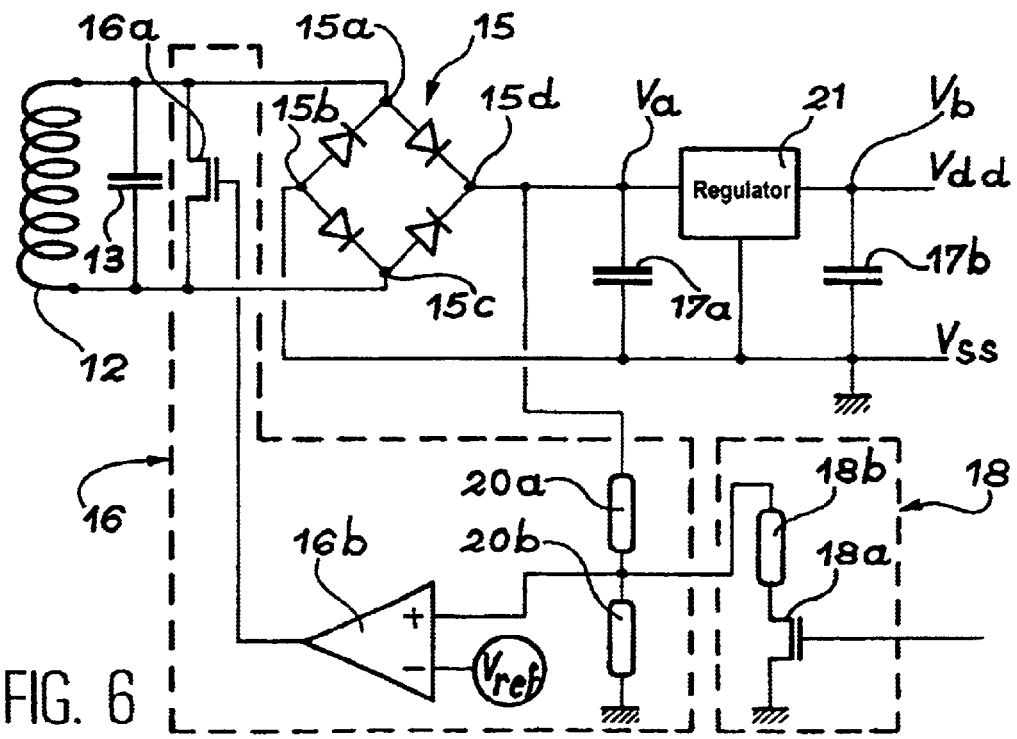

FIG. 6 shows a fourth embodiment of the invention in which the modulation of the voltage output by rectifier 15 is obtained for a different type of modulator 18 than in the previous three embodiments. In this embodiment, regulator 16 comprises a transistor 16a whose drain and source are connected to resonant circuit 12/13 and whose gate is connected to the output of differential amplifier 16b. The negative terminal of this differential amplifier receives reference voltage Vref and its positive terminal receives the voltage supplied by modulator 18.

In this embodiment, the modulator 18 comprises a transistor 18a and an electronic dipole 18b connected to one another in series and connected to the negative terminal of differential amplifier 16b via a divider bridge 20a/20b. Modulator 18 therefore acts directly on one input of the differential amplifier 16b, modulating the division ratio of divider bridge 20a/20b powered by the rectified voltage provided by power supply line Vdd.

It is also possible to effect the modulation by adding a modulated voltage to reference voltage Vref on the negative terminal of differential amplifier 16b.

This type of arrangement makes it possible to modulate the quality coefficient of the portable object. However, regulator 16 loses its regulating function; a second regulator 21 is therefore connected to power supply line Vdd between points Va and Vb, which are the connection points of two capacitors 17a and 17b that are connected in parallel to one another between the power supply line Vdd and the output line Vss of the apparatus. The role of capacitors 17a and 17b connected in parallel is the same as that of storage capacitor 17 of FIGS. 3, 4 and 5.

This type of embodiment has the advantage of enabling the modulation depth to be adjusted by selecting values for resistors 20a, 20b constituting the divider bridge.

What is claimed is:

1. Remote transmission apparatus for a portable object equipped with an antenna having terminals and connected by inductive coupling to a fixed station that is equipped with a power supply and at least one antenna that emits an alternating magnetic field and receives signals transmitted by the portable object, comprising:

a data processor for processing and storing data concerning the portable object;

a voltage rectifier for transforming the AC voltage supplied by the antenna into a DC voltage carried by a power line to the data processor, said rectifier having inputs and outputs;

a voltage regulator for regulating the DC voltage provided by said rectifier, said regulator having an input and an output, said inputs being connected to the terminals of the antenna; and a modulator for modulating the signals to be transmitted, said modulator having an input and an output;

wherein the modulator comprises a transistor connected to an electronic dipole that causes a drop in voltage between the input and output of said modulator, the output of said modulator being connected to the inputs of the voltage regulator and the input of said modulator being connected to the outputs of said rectifier, the voltage on the terminals of the antenna being regulated by the voltage regulator, the modulation of the signal transmitted to the antenna being a current modulation.

2. Apparatus of claim 1, wherein the transistor and the dipole of the modulator are connected in parallel with one another, the transistor/dipole assembly being connected in series to the voltage supply line between an output of the rectifier and an input of the voltage regulator.

3. Apparatus of claim 1, wherein the transistor and the dipole of the modulator are connected in series with one another, the transistor/dipole assembly being connected to a divider bridge that is connected in turn to one input of the voltage regulator.

4. Apparatus of claim 1, wherein the electronic dipole is a Zener diode.

5. Apparatus of claim 1, wherein the electronic dipole is a diode.

6. Apparatus of claim 1, wherein the electronic dipole is a MOS transistor whose gate is connected to the drain.

7. Apparatus of claim 1, wherein the voltage regulator comprises a transistor whose drain and source are connected to the output of the rectifier and a differential amplifier whose output is connected to the gate of the transistor and whose inputs receive both a reference voltage and the voltage of the power supply line.

8. Apparatus of claim 1, wherein the voltage regulator comprises a transistor connected in parallel to the terminals of the antenna and a differential amplifier whose output is connected to the gate of the transistor and whose inputs receive both a reference voltage and the voltage from the power supply line.

9. Apparatus of claim 1, wherein the voltage regulator comprises a first transistor connected in parallel to the terminals of the antenna, a second transistor connected to the output of the rectifier and a differential amplifier whose inputs receive both a reference voltage and the voltage from the power supply line, and whose output is connected to a distributor circuit that is in turn connected to the gates of the first and second transistors.

10. Apparatus of claim 1, and further comprising a demodulator for demodulating signals received from the fixed station.

* * * * *